(12) United States Patent
Clarkson et al.

(10) Patent No.: US 7,421,092 B2
(45) Date of Patent: Sep. 2, 2008

(54) METHOD AND APPARATUS FOR SITUATION RECOGNITION USING OPTICAL INFORMATION

(75) Inventors: Brian Clarkson, Tokyo (JP); Makoto Murata, Tokyo (JP); Tamaki Kojima, Tokyo (JP); Wenwu Zhao, Tokyo (JP)

(73) Assignee: Sony Corporation, Tokyo (JP)

( * ) Notice: Subject to any disclaimer, the term of this patent is extended or adjusted under 35 U.S.C. 154(b) by 456 days.

(21) Appl. No.: 11/168,667

(22) Filed: Jun. 28, 2005

(65) Prior Publication Data

US 2006/0088187 A1    Apr. 27, 2006

(30) Foreign Application Priority Data

Jun. 29, 2004  (JP)  ............................. 2004-191308
Jan. 4, 2005   (JP)  ............................. 2005-000115

(51) Int. Cl.
*G06K 9/00* (2006.01)

(52) U.S. Cl. ...................................... 382/103

(58) Field of Classification Search ............... 382/103
See application file for complete search history.

(56) References Cited

U.S. PATENT DOCUMENTS 3,663,807 A * 5/1972 Hecker ....................... 708/814

* cited by examiner

*Primary Examiner*—Bhavesh Mehta
*Assistant Examiner*—Jonathan C Schaffer
(74) *Attorney, Agent, or Firm*—Finnegan, Henderson, Farabow, Garrett & Dunner, L.L.P.

(57) ABSTRACT

A situation recognition apparatus includes: an optical information acquisition unit configured to acquire optical information; a storage configured to store a plurality of pieces of optical information; a processing unit configured to match a plurality of the pieces of optical information stored in the storage and optical information newly acquired by the optical information acquisition unit; and an output unit configured to output a result of the matching. The storage further stores a probabilistic model that numerically represents transitions between the plurality of pieces of optical information.

16 Claims, 11 Drawing Sheets

FIG. 12A

Matching Processing Using Landmark Matche (A, B, N, M, threshold)

| 1 | now ← 0 |
| --- | --- |
| 2 | prev ← 1 |
| 3 | alpha(prev,1:M) ← A(N,1:M) |
| 4 | for i ← N-1 to 1 |
| 5 |    for j ← 1 to M |
| 6 |       temp(1:M) ← alpha(prev,1:M)+B(j,1:M) |
| 7 |       alpha(now,j) ← max[temp(1:M)]+A(i,j) |
| 8 |       pred(i,j) ← argmax[temp(1:M)] |
| 9 |    swap(now,prev) |
| 10 |    if Is-Landmark-Present(i,pred,threshold) |
| 11 |       landmark ← i |
| 12 |       terminate loop |
| 13 | s(landmark) ← argmin[alpha(prev,1:M)] |
| 14 | for i ← landmark+1 to N |
| 15 |    s(i) ← pred(i,s(i-1)) |
| 16 | return s(landmark:N) |

Input Parameters:
A : state belief matrix of size M × N:Aij=log $P(x_i \mid s_i=j)$=-Hij
B : state transition matrix of size M × M:Bij=log $P(S_t=i \mid s_{t-1}=j)$
threshold : threshold for landmark detection

FIG. 12B

Is-Landmark-Present(i,pred,threshold)

| 1 | count(1:M) ← 0 |
| --- | --- |
| 2 | for j ← 1 to M |
| 3 |    count(pred(i,j)) ← count(pred(i,j))+1 |
| 4 | if max(count(1:M))> threshold |
| 5 |    return true |
| 6 | else |
| 7 |    return false |

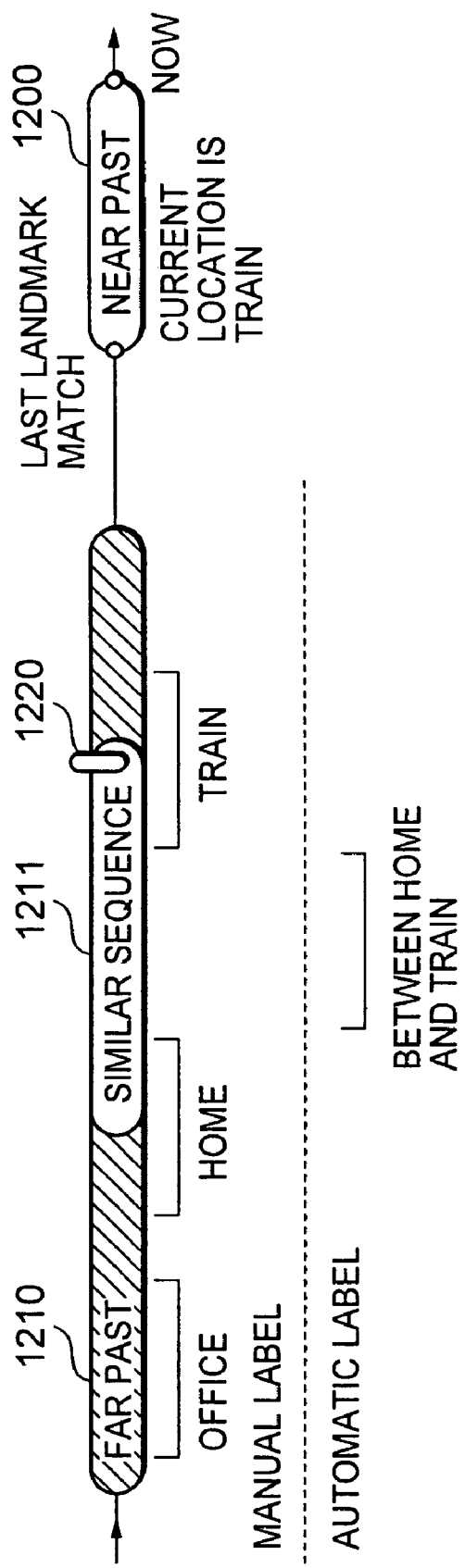

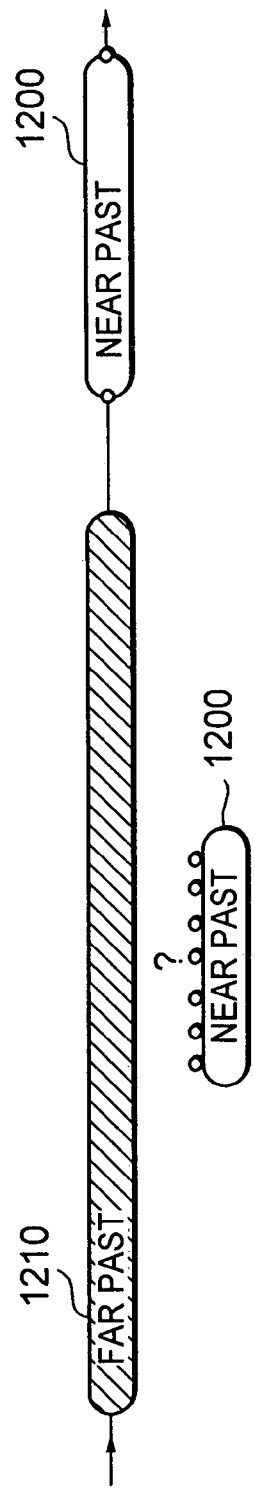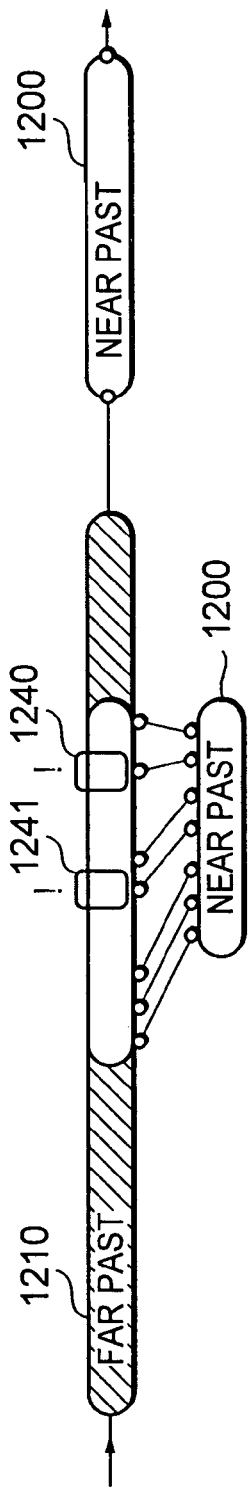

METHOD AND APPARATUS FOR SITUATION RECOGNITION USING OPTICAL INFORMATION

BACKGROUND OF THE INVENTION

1. Field of the Invention

The present invention relates to a method and apparatus for situation recognition, a system, a computer program, and a recording medium and, more particularly, to a situation recognition method and apparatus for recognizing a situation by comparing the current and past situations by using optical information, a system, a computer program, and a recording medium.

2. Description of Related Art

In a technical field of robotics, there is a case where a parabolic camera having a 360° field of view and image recording techniques are combined to perform location measurement on a robot, as described in the following non-patent documents 2 to 4 by way of example. Such technology performs detailed calibration processing for associating an acquired image or image group with a particular point in a reference image database space called an image atlas.

Matching of images which is performed for the above-mentioned association uses local and high-resolution images. For this reason, the image atlas need to contain information about all points in the map space, and further, the information at each of the points need to be represented in a form which does not depend on sensor orientation.

In a technical field of wearable computing, techniques for matching the current situation and past situations by using sensors or other similar means have been proposed as methods for realizing context awareness for triggering behaviors with appropriate timing, and so-called episodic memory for remembering what a user or other persons have performed in similar situations, or identifying a situation which repeatedly occurs or is newly occurring.

Information about "location" is very useful in terms of context awareness. Namely, even if the location of a user can only be recognized, it is possible to identify the current situation by using both the recognition result and information about a past situation.

Among the above-mentioned methods, techniques that do not use visual information are as follows:

radio-frequency tag (RF tag: Patent Document 2)
 infra-red tag (IR tag: Non-Patent Document 5)
 fiducial marker in environment (Patent Document 3)
 global positioning system (GPS)
 ultrasonic beacon
 personal handy phone system (PHS)
 802.11 wireless network

[Non-Patent Document 1] Thrun, S., D. Fox, et al. (2001) "Robust Monte Carlo localization for mobile robots." Artificial Intelligence 128(1-2): 99-141.

[Non-Patent Document 2] Betke, M. and L. Gurvits (1997) "Mobile Robot Localization Using Landmarks." IEEE Transactions on Robotics and Automation 13(2): 251-261.

[Non-Patent Document 3] Jogan, M. and A. Leonardis (2000). "Robust localization using panoramic view-based recognition." 15th International Conference on Pattern Recognition 4: 136-139.

[Non-Patent Document 4] Pajdla, T. and V. Hlavac (1999) "Zero-Phase Representation of Panoramic Images for Image-based Localization." 8th International Conference on Computer Analysis of Images and Patterns: 550-557.

[Non-Patent Document 5] Starner, T., D. Kirsh, et al. (1997). "The Locust Swarm: An Environmentally-powered, Network-less Location and Messaging System." International Symposium on Wearable Computers, Cambridge Mass.

[Non-Patent Document 6] Aoki, H., B. Schiele, et al. (1999). "Realtime Personal Positioning System for Wearable Computers." International Symposium on Wearable Computers '99.

[Non-Patent Document 7] Rungsarityotin, W. and T. Starner (2000). "Finding location using omnidirectional video on a wearable computing platform." Proceedings of IEEE International Symposium on Wearable Computing (ISWC 2000), Atlanta, Ga.

[Patent Document 1] U.S. Pat. No. 4,737,794, "Method and apparatus for determining remote object orientation and position".

[Patent Document 2] U.S. Pat. No. 6,680,702, "Radio frequency resonant tags with conducting patterns connected via a dielectric film"

[Patent Document 3] U.S. Pat. No. 6,073,044, "Method for determining the location in physical space of a point of fiducial marker that is selectively detachable to a base"

SUMMARY OF THE INVENTION

In a technical field of robotics, there are situation recognition techniques using laser-range finders (Non-Patent Document 1). In a system disclosed in Non-Patent Document 1, a laser-range finder is used for localization of a robot, and the current location of the robot is estimated on the basis of the context of measurement results from past to present and the current measurement result.

This is because if a robot provided with the above-mentioned conventional system stays at one location, measurement results which can be acquired from the surrounding environment by the laser-range finder are limited and are too sparse. Namely, because of inherent limitations of device characteristics of the laser-range finders, the location of the robot is difficult to identify with a measurement result acquired at one location, and additional information is necessary for more accurate identification. The additional information is typically derived from past measurement results and location estimation results acquired by the conventional system. Typically, the above-mentioned laser-range finders are useful only in indoor environments.

Accordingly, it is desirable to provide a situation recognition method and apparatus which are useful not only in indoor environments but also other environments.

In the situation recognition method of the robotics, there is a case where a robot itself needs to execute a predetermined action. For example, the motion of the robot is controlled so that the robot is rotated about its central axis by a plurality of times, in order to realize highly reliable depth measurement by using a narrow field-of-view laser-range finder provided in the robot. As another example, a robot is made to explore in advance an unmapped area or a poorly mapped area in order to improve the map database originally provided in the robot.

However, it is desirable to effect situation recognition by using only measurement results passively acquired along with movements of a device, without requiring any additional action such as one of the actions in the robotics, i.e., without causing a platform, on which the device is mounted, to perform a predetermined action or actions.

On the other hand, techniques in the above-mentioned wearable computing make it necessary to construct infrastructure in advance for implementation, for example, satellites in orbits and wireless repeaters arranged in areas where users may be located. However, in many cases, such infrastructure and construction thereof may be expensive. Furthermore, GPS does not function indoors, and if the above-mentioned system of fiducial markers is to be used, an extremely large number of fiducial markers will be necessary.

Furthermore, these conventional systems only provide information about locations, and do not provide any information about situations at locations or changes thereof. For example, the above-mentioned 802.11-based localization system can provide information indicating such that a location identified by the system is a meeting room. However, the system cannot provide any information as to whether the meeting room is full of persons or lights are dimmed.

For this reason, in order to recognize situations in far more detail, it is desirable to perform situation recognition with using optical information in addition to the location measurement.

In the above-mentioned technical field of wearable computing, there is a case where a system including a camera is used for location measurements (Non-Patent Documents 6 and 7). In the technique disclosed in Non-Patent Document 6, coarse optical features of low resolution are used as an input into image matching processing. However, in the technique described in Non-Patent Document 6, a wide field-of-view sensor is not used, and a database to be referred to in the matching processing stores video clips which are manually chosen and segmented.

In terms of convenience of the system, the above-mentioned database construction method which greatly relies on manual work is not desirable, and it is more preferable that the amount of recorded data naturally increase as the system is used longer.

Furthermore, in the technique described in Non-Patent Document 6, a histogram is used in order to reduce the influence of sensor orientation due to the use of a narrow field-of-view sensor. However, if the histogram is used, nearly all spatial information is lost. As a result, there is a possibility that feature elements which exists at a certain location and facilities identification of the location are deleted.

It is desirable to utilize the above-mentioned optical features during execution of matching processing.

The technique disclosed in Non-Patent Document 7 uses similarity between images captured by a wide field-of-view camera. However, the technique removes information about the orientation of captured images in order to maximize the similarity between the images. This calculation puts a heavy burden on a processor. There may be a case where it is reasonable to aim at maximization of the effectiveness of a given database of training video at the sacrifice of discrimination ability for orientation. However, it is apparent in practice that how many examples for training should be collected is not a problem, but how accurately similar locations or situations can be identified is important. Once an actual system is built, new training examples are easily acquired.

Non-Patent Document 7 attempts to estimate continuous motion and a location pattern by a Condensation algorithm. The Condensation algorithm is a Monte Carlo solution of a continuous analog of a Viterbi algorithm. The accuracy of the Condensation algorithm depends on the number of samples propagating through a model, and its calculation may be a very large calculation load compared to Viterbi processing.

In the technique of Non-Patent Document 7, the database of recorded past video and the current moment are not merely matched, but the motion vector of user's movement is estimated. For this reason, the above-mentioned large calculation load is naturally expected. Accordingly, in the technique of Non-Patent Document 7, it is required to reduce the size of the image database. In other words, it is a precondition that the position of the user is known to a certain extent. However, if it is not necessary to accurately detect motion vectors, i.e., if a current situation is roughly recognized, such a precondition is not desirable.

The present invention has been made in view of the above-described issues.

Furthermore, the inventor of the present invention have noted that many systems, to which the present invention are applicable (for example, a wearable computer attached to a user or a robot), move and habitually trace paths in predetermined patterns. Namely, if more effective situation recognition is to be implemented, it is desirable not to compare simple temporal moments but to perform matching which takes history within a certain time period or context into account. Furthermore, it is desirable to provide a system capable of effectively operating even in a situation where a plurality of possible routes which extend toward or away from a certain "location" exist in a space.

In accordance with one embodiment of the present invention, there is provided a situation recognition apparatus that recognizes the current situation by using optical information. The apparatus includes: an optical information acquisition unit configured to acquire optical information; a storage configured to store a plurality of pieces of optical information; a processing unit configured to match a plurality of the pieces of optical information stored in the storage and optical information newly acquired by the optical information acquisition unit; and an output unit configured to output a result of the matching. The storage further stores a probabilistic model which numerically represents transitions between the plurality of pieces of optical information. The processing unit includes: a difference calculation section that obtains differences between the plurality of pieces of optical information and the newly acquired optical information, respectively and calculates a value indicative of the differences; a difference storage section that stores a plurality of the calculated values indicative of the differences in time order; and a matching processing section that performs matching by using a time sequence of a plurality of the stored values and the probabilistic model.

The probabilistic model maybe configured such that each state corresponds to a respective one of the stored plurality of pieces of optical information and transition parameters between the states are set to predetermined values. The processing unit may further include a model constructing section configured to construct the probabilistic model on the basis of the plurality of pieces of optical information stored in the storage. As the probabilistic model, for example, a Hidden Markov Model may be used.

In the situation recognition apparatus, the processing unit may further include a coding processing section configured to compress a data amount of the optical information to be used in the matching. The coding processing section may output newly acquired optical information if a value indicative of a difference between the newly acquired optical information and the last optical information that passed through the coding processing section is larger than a predetermined threshold.

In the situation recognition apparatus, the matching processing section may determine by using a Viterbi algorithm an optimal state sequence which matches a plurality of the stored pieces of optical information and a time sequence of the values indicative of the differences. The determination of the optimal state sequence may be performed by extending a path in a Viterbi Trellis diagram in a time-reversed direction from a state which is nearest to a current time. Alternatively, the matching processing may be configured such that if substantially all paths (all paths or nearly all paths) pass through one state in the Viterbi Trellis diagram, this one state is detected as a landmark, and the landmark is used to set a length of the time sequence of the values indicative of respective differences, the time sequence being used in the matching processing. Furthermore, whether or not paths passing through the one state are the "substantially all paths" may be determined by using a predetermined threshold which is set for the number of paths.

Alternatively, in the situation recognition apparatus, the matching processing section may be configured such that, if the matching processing section obtains optical information which matches with one of the stored plurality of pieces of optical information with a probability higher than a predetermined threshold, the found optical information is detected as a landmark and, by using the landmark, the length of the time sequence of the values indicative of the differences is determined.

In the situation recognition apparatus, at least a part of the plurality of pieces of optical information stored in the storage may be respectively marked with labels indicative of corresponding states. Alternatively, at least a part of the plurality of pieces of optical information stored in the storage may not be marked with labels indicative of corresponding states. The output unit may output the matching result to a user by using information indicated by a label or labels corresponding to one or a plurality of pieces of information marked with the labels, which are closer in time to the optical information that is not marked with the label or the labels if the newly acquired optical information and the optical information that is not marked with the label are matched. Alternatively, the processing unit may attach labels to the optical information that is not marked with the labels, by using information indicated by a label or labels corresponding to one or a plurality of pieces of information marked with the labels, which are closer in time to the information that is not marked with the label.

In the situation recognition apparatus, the optical information acquisition unit may include a plurality of photosensors. The optical information acquisition unit may further include a condenser for condensing light onto each of the plurality of photosensors.

In accordance with another embodiment of the present invention, there is provided a system which includes a situation recognition apparatus and a processing execution apparatus which executes predetermined processing by using a recognition result outputted from the situation recognition apparatus. In the system, the situation recognition apparatus according to the above-mentioned embodiment is used as the situation recognition apparatus. The system may be, for example, a wearable computer or a robot, etc.

In accordance with still another embodiment of the present invention, there are provided a method of recognizing a current situation by performing matching processing of newly acquired optical information with a plurality of pieces of optical information stored in advance, a computer program which causes a computer to execute the method, a recording medium on which the computer program is recorded, and/or a signal coded to transmit the computer program. The situation recognition method includes: constructing a probabilistic model which numerically represents transitions between the stored plurality of pieces of optical information; obtaining differences between the stored plurality of pieces of optical information and the newly acquired optical information; calculating a value indicative of the differences; setting a time sequence of the values indicative of the differences, in which the calculated values indicative of the differences are arranged in time order; and matching by using the time sequence of the values indicative of the differences and the probabilistic model.

According to the present invention, it is possible to provide an apparatus, a method, a computer program and a recording medium, all of which can recognize a current situation by matching with history in a certain time period into account, instead of comparing simple temporal moments when matching a past situation and a current situation by using optical information, and/or a system equipped with the apparatus, the method, the computer program or the recording medium.

BRIEF DESCRIPTION OF THE DRAWINGS

FIG. 12A shows a pseudo code representing one example of a program which realizes a matching processing according to an embodiment of the present invention;

FIG. 12B shows a pseudo code representing one example of a program which detects a landmark according to an embodiment of the present invention;

FIG. 14 is an explanatory view schematically showing one example of a method of applying an embodiment of the present invention;

FIG. 15A is an explanatory view schematically showing another example of a method of applying an embodiment of the present invention;

FIG. 15B is an explanatory view schematically showing another example of a method of applying an embodiment of the present invention; and FIG. 15C is an explanatory view schematically showing another example of a method of applying an embodiment of the present invention.

DETAILED DESCRIPTION OF EMBODIMENTS

Embodiment of the present invention will be described below in detail with reference to the accompanying drawings.

According to one embodiment of the present invention, there is provided a situation recognition apparatus 1 capable of associating a current situation with a past situation while taking into account context related to a time sequence of optical information acquired sequentially.

Figure 1:
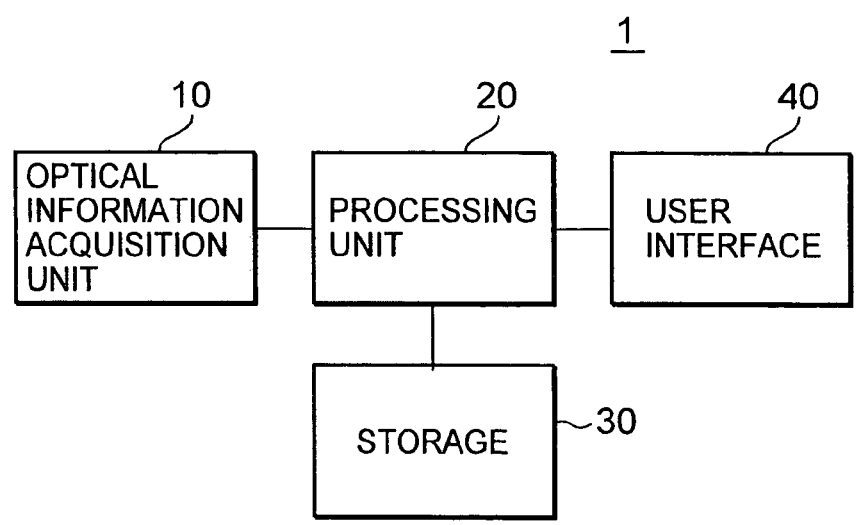
FIG. 1 is a block diagram showing a configuration of a situation recognition apparatus according to an embodiment of the present invention.

The situation recognition apparatus 1 includes, as shown in FIG. 1 by way of example, an optical information acquisition unit 10 which acquires optical information and provides an output, a processing unit 20 which carries out predetermined processing on the output and performs situation recognition, a storage 30 which records information necessary for the predetermined processing, and a user interface 40 which presents a result of the situation recognition to a user as well as accepts operation inputs from the user. The processing unit 20, the storage 30 and the user interface 40 of the apparatus 1 can be realized, for example, by executing software for realizing predetermined processing for a situation recognition in a computer system which includes a CPU, a memory and a man-machine interface.

Figure 2:
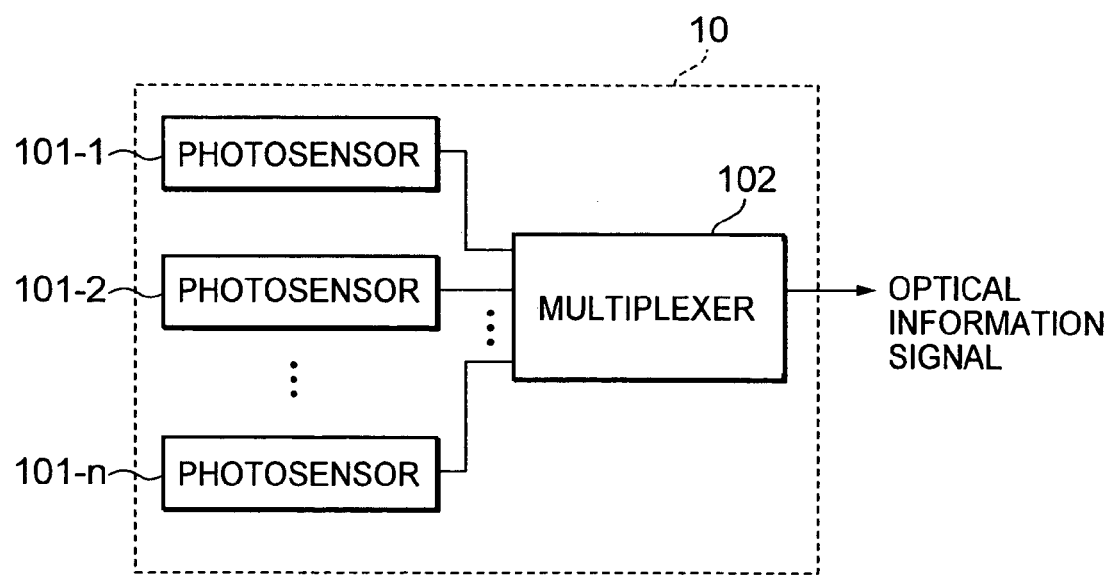
FIG. 2 is a block diagram showing one example of a configuration of an optical information acquisition unit according to an embodiment of the present invention.

The optical information acquisition unit 10 extracts optical information about external environment without largely depending on its orientation. The optical information acquisition unit 10 includes, as shown in FIG. 2 by way of example, a plurality of photosensors 101-1 to 101-n and a multiplexer 102 which combines the outputs from the plurality of photosensors 101-1 to 101-n and outputs a result. The plurality of photosensors 101-1 to 101-n are arranged, for example, two-dimensionally or three-dimensionally. In a case of two-dimensional arrangement, the plurality of photosensors 101-1 to 101-n may be arranged in a predetermined matrix or grid form, while in a case of three-dimensional arrangement, the plurality of photosensors 101-1 to 101-n may be arranged so as to form a balloon or spherical shape. Furthermore, the distance between each of the photosensors 101-1 to 101-n may be determined according to the field of view of the photosensor.

Further, each of the plurality of photosensors 101-1 to 101-n is provided with a condenser, for example, a condenser lens, a pinhole or a slit. Furthermore, in order to cover a wider field of view, all the photosensors 101-1 to 101-n may be configured to share a single wide-angle lens or fish-eye lens, or each of the plurality of photosensors 101-1 to 101-n may be provided with a condenser lens or the like. The plurality of photosensors 101-1 to 101-n may be arranged around the apparatus 1 or on a user or a platform that carries the apparatus 1, so that they are able to acquire far more efficiently optical situations of the external environment.

Figure 3A:
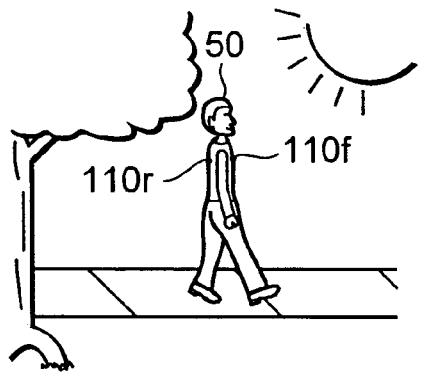
FIG. 3A is an explanatory view showing one example of a configuration of an optical information acquisition unit according to an embodiment of the present invention.
Figure 3B:
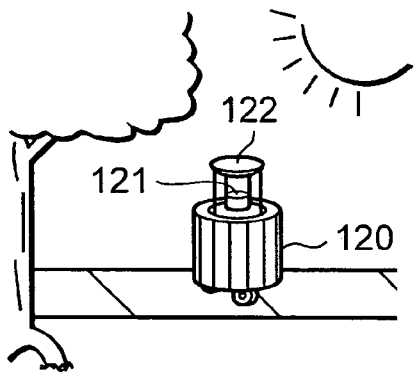
FIG. 3B is an explanatory view showing another example of a configuration of an optical information acquisition unit according to an embodiment of the present invention.

Each of the photosensors 101-1 to 101-n includes, for example, a photodiode which detects light of one or a plurality of colors (for example, R, G and B). Furthermore, an image capturing device, such as a CCD, which acquires an image of two-dimensional optical information, or a unit having a large wide field of view, for example, an omnidirectional camera, may be used in place of the plurality of photosensors 101-1 to 101-n. The apparatus 1 may be made portable (FIG. 3A) or configured to have a self-propelling function (FIG. 3B). In a case of FIG. 3A where a user 50 carries the apparatus 1, optical information acquisition units 110f and 110r each of which functions as the optical information acquisition unit 10 are respectively arranged on the front and back of the body of the user 50. In a case of FIG. 3B, an omnidirectional camera provided with a camera 121 and a mirror 122 for projecting rays onto the camera 121 from all directions is incorporated in a self-propelling or self-advancing type of platform 120.

In the present invention, since matching processing that utilizes context is performed, there is no need for information of high resolution. Accordingly, if a typical type of image capturing apparatus is used for acquiring optical information, it is preferable to lower a resolution of acquired optical information, and to use the optical information of low resolution in processing according to the present embodiment, which will be described later.

The optical information acquisition unit 10 according to the present embodiment is configured such that the multiplexer 102 combines the outputs from the plurality of photosensors 101-1 to 101-n and provides the result. Alternatively, difference values among photosensors or relative values of light detected after standardization or the like may be used instead of the photosensor outputs.

Figure 4:
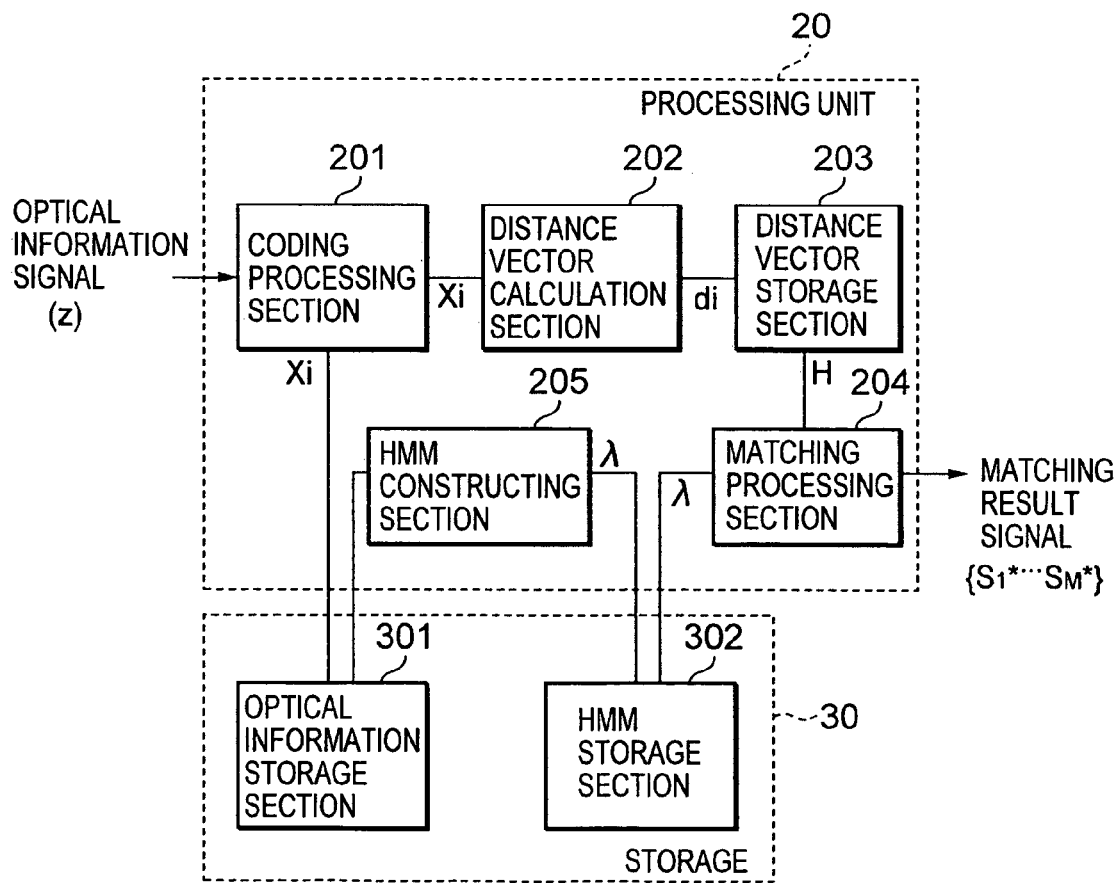
FIG. 4 is a block diagram showing one example of a configuration of a processing unit and a storage according to an embodiment of the present invention.

The processing unit 20 receives an input of optical information outputted from the optical information acquisition unit 10, performs matching processing which takes account of context in a time sequence of the optical information, and outputs a result of the matching processing to the user interface 40. The processing unit 20 includes, as shown in FIG. 4 by way of example, a coding processing section 201, a distance vector calculation section 202, a distance vector storage section 203, a matching processing section 204, and a Hidden Markov Model (HMM) constructing section 205. The storage 30 includes an optical information storage section 301 and an HMM storage section 302.

In the present embodiment, the distance vector calculation section 202 and the distance vector storage section 203 are constituent elements respectively corresponding to the difference calculation section and the difference storage section which have been mentioned in the section "Summary of the Invention". Namely, a distance vector which will be described below in detail is used as one example of a value indicating difference or dissimilarity between a plurality of pieces of optical information. Of course, the kind of "value indicative of difference" which can be used in the present embodiment is not limited to only the distance vector, and may be any arbitrary form of numerical representation as long as such form can represent a value indicative of differences between a plurality of pieces of optical information to be handled in the present embodiment.

Furthermore, in the present embodiment, a Hidden Markov Model in which a plurality of pieces of optical information are associated with states is used as the probabilistic model mentioned in the section "Summary of the Invention", which numerically represents changes or transitions among the plurality of pieces of optical information. The Hidden Markov Model is a probabilistic model including: internal states that make transitions in accordance with a Markov process in which a probability of a certain symbol (in the present embodiment, optical information) depends only on the previous symbol; and a probability distribution for a symbol to be appeared in each state. It should be noted that the kind of probabilistic model which can be used in the present embodiment is not limited to the Hidden Markov Model, and may be any arbitrary model that can numerically represent a situation in which a plurality of pieces of optical information to be handled in the present embodiment make changes or transitions.

The coding processing section 201 performs coding processing, such as compressing a data volume by omitting optical information which provide no or almost no new information and optical information which is assumed to be unnecessary or redundant for situation recognition, so as to construct an effective database more suitable for the matching processing according to the present embodiment. Optical information outputted from the coding processing section 201 is stored into the optical information storage section 301 and is also sent to the distance vector calculation section 202. The distance vector calculation section 202 obtains a feature vector for characterizing the optical information outputted from the coding processing section 201. In the present embodiment, the distance between the optical information and each of the plurality of pieces of optical information stored in the storage 30 is calculated, and a distance vector having the respective calculated distances as its vector elements is calculated as the feature vector. The distance vector storage section 203 stores a predetermined number of the distance vectors in the order of output from the coding processing section 201. The order in which the distance vectors are stored corresponds to the temporal order in which the optical information is acquired. Namely, the contents stored in the distance vector storage section 203 indicate a time sequence of the distance vectors, and represent temporal context leading to the current situation to be matched with one of past situations. In the following description, a certain period of past which corresponds to the optical information stored in the storage 30 is called a "far past", and a time period including the current time and a certain period of time leading to the current time, which correspond to optical information represented in form of the distance vectors stored in the distance vector storage section 203, is called a "near past".

The matching processing section 204 detects a far past sequence optimally matching a near past sequence corresponding to a time sequence of the distance vectors, for example, by using an HMM constructed from a group of past optical information and a Viterbi algorithm. The matching processing in the present embodiment will be described later with reference to FIG. 6.

Figure 5:
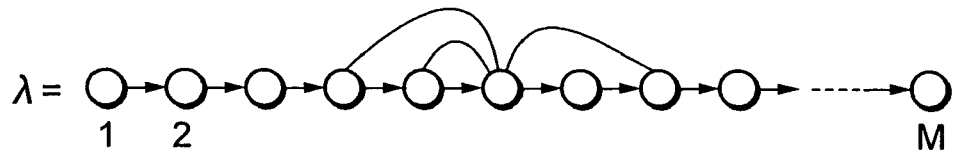
FIG. 5 is an explanatory view showing one example of a Hidden Markov Model according to an embodiment of the present invention.

The optical information outputted from the coding processing section 201 is stored into the optical information storage section 301, and is read therefrom for constructing an HMM that is to be used in the matching processing according to the present embodiment, in a predetermined cycle or in accordance with an instruction from the outside. The HMM constructing section 205 constructs an HMM (λ) and stores the HMM (λ) into the HMM storage section 302. As shown in FIG. 5 by way of example, the HMM (λ) which is configured such that M-number of past images (1 to M) correspond to individual states, respectively, is stored into the HMM storage section 302. An HMM construction method according to the present embodiment will be described later with reference to FIG. 9.

The operation of the apparatus 1 will be described below.

The apparatus 1 according to the present embodiment executes matching processing of situations that can be optically recognizable according to the embodiment of the present invention. "Similarity" which is considered in the matching processing according to the present embodiment contains optical (or visual) similarity between two situations and similarity in temporal context. The term "temporal context" corresponds to, for example, a time-sequence pattern of optical information, and means what sequence of past situations (optical information) has led to the current situation.

In the following description, reference will be made to an example in which a situation recognition method according to the present embodiment is applied to location recognition.

In an application in which the photosensors 101-1 to 101-$n$ are attached to or embedded in a mobile platform such as a human, a robot or a vehicle, correlation between optical situations and locations is considerably high. In this case, the location recognition is performed through the following steps (1) to (3). It is assumed here that the following example uses image information as the optical information.

(1) Image information previously acquired from past situations is labeled with location information. This processing only needs to be executed once, and may also be performed periodically for updating, so as to adapt the apparatus 1 to new situations. The processing may notify a user, for example, when a new image is stored, and requests the user to label the stored new image with location information. Furthermore, in a case where the output from a positioning system capable of outputting location information, such as a GPS, may be used, the processing may automatically label image information by using such location information. Furthermore, the apparatus 1 may be configured such that labeled image information is loaded in advance from outside via wired or wireless communication or through a recording medium storing such information.

(2) A situation which is the most similar to the current situation among the past situations and the confidence of match (similarity) are determined by using the situation recognition method according to the present embodiment.

(3) If the confidence of match is higher than a predetermined value, a location indicated by location information with which image information corresponding to the relevant past situation is labeled is determined as a location of the current situation.

Figure 6:
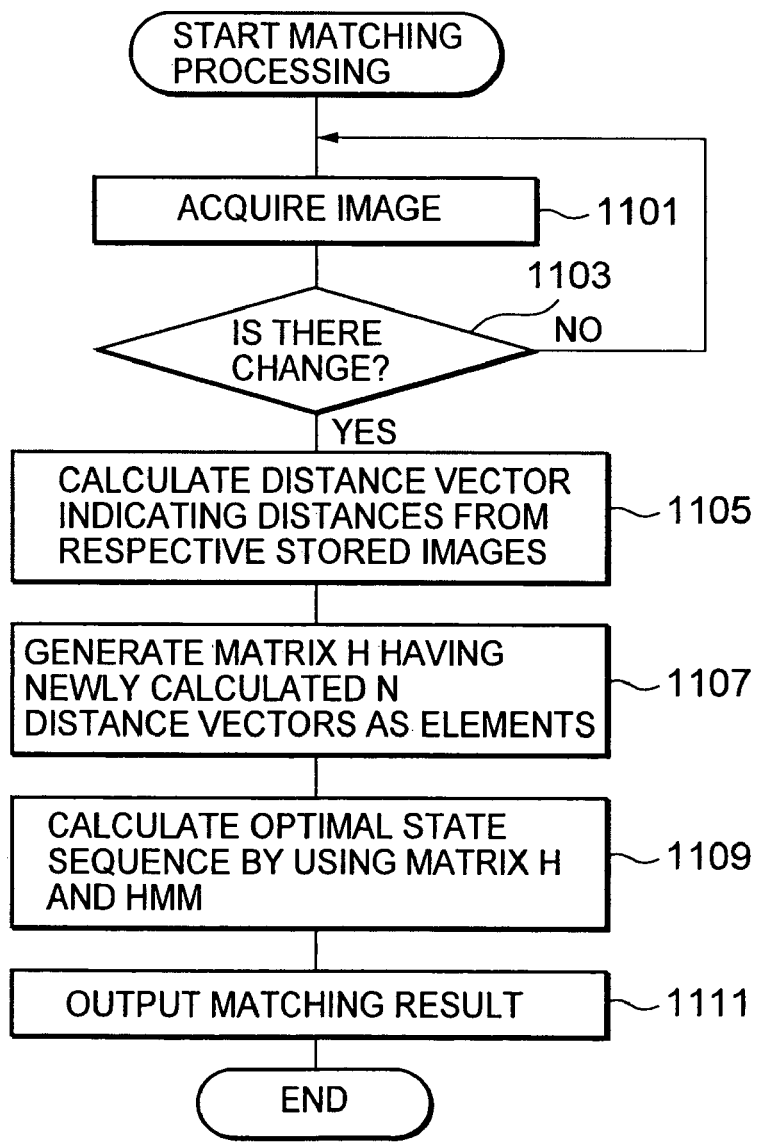
FIG. 6 is a flowchart showing one example of matching processing according to an embodiment of the present invention.

The matching processing according to the present embodiment which is performed in step (2) is carried out by the steps shown in the flowchart of FIG. 6.

First, in step 1101, image information is acquired as a current optical information. In the present embodiment, as means for grasping a situation of surrounding environment as faithfully as possible and for suppressing an increase of a calculation load in the matching processing, it is assumed that an input of image information having a low resolution and a small size but a comparatively wide field of view is accepted. In a case where the present embodiment is applied to the field of wearable computing, cameras may be respectively attached to the front and back of the body of a user as shown in FIG. 3A so as to acquire image information on the front and rear side of the user.

In the optical information acquisition unit 10 according to the present embodiment, the above-mentioned CCD color camera may be a digital camera or an array of photosensors. It is preferable that measurement results of the CCD color camera are recorded in a continuous arrangement of RGB information for each pixel, for example, a RGB-packed format in which RGB information is recorded as (Ri, Gi, Bi). According to this configuration, it is possible to reduce loads in calculation processing which will be described later.

Alternatively, the optical information acquisition unit 10 may be realized, for example, by attaching a ultra-wide-angle lens (fish-eye lens) or a parabolic mirror to the front of the CCD color camera, and by acquiring an image having a desired resolution after filtering and decimating. According to this configuration, although detailed features in acquired images become undistinguishable, general or rough features of optical environment may be extracted without depending on the orientation of the sensor.

In the following description, assuming that 1 denotes a sensor index (which corresponds to a pixel location in the case of an image); c denotes a color channel index (1, 2 and 3 typically denote red, green and blue, respectively); and i denotes a measurement index which is incremented each time new measurement is performed, a single measurement result is expressed as $x_i(l, c)$. Furthermore, if the sensors used in the optical information acquisition unit 10 are image capturing units which acquire image information, the sensor index corresponds to a pixel location. Furthermore, $t_i$ denotes a time (for example, seconds) at which the i-th measurement is performed.

The measurement in step 1101 is performed periodically at a predetermined cycle. The measurement cycle in step 1101 is determined according to the speed at which a structure of optical environment changes or is expected to change. In a case where the apparatus 1 according to the present embodiment is applied to, for example, an in-vehicle system, it is preferable that image information be acquired in a short cycle compared to wearable systems configured such that users wear the present system. Experiment results performed by the inventor of the present invention has shown that a capture cycle of 5 Hz is suitable for the wearable system, namely a case where a user wears the apparatus 1 and walks around.

A plurality of measurement results acquired in step 1101 are sent to the processing unit 20 of the apparatus 1, and processing of the processing unit 20 is performed by dedicated hardware or by predetermined software that may be executed by a general-purpose information processing unit or a commodity computer.

Next, in step 1103, coding processing is performed on the acquired images by the coding processing section 201. The processing of step 1103 executes the processing of comparing the newly acquired image (current image) with the last image that passed through step 1103 at the previous time, and outputting the current acquired image only if a change larger than a predetermined threshold occurs between these two images. According to this processing, image information can substantially be compressed without losing any useful image information. In other words, according to this processing, it is possible to prevent loading of redundant images which do not provide any new information, thereby enabling to suppress an increase in the data amount of images to be stored into the optical information storage section 301. Furthermore, according to this processing, it is possible to construct a larger HMM which efficiently contains a multiplicity of pieces of information concerning a past that can be usable in the matching processing.

Furthermore, according to the compression effect of this processing, the calculation load can be reduced in the apparatus 1, and the modeling capability of a Hidden Markov Model (HMM) to be used in the processing of step 1109, which will be described later, can be improved.

The coding processing section 201 makes a decision as to the presence or absence of a change on the basis of, for example, the dissimilarity and the time interval between a newly acquired image Z and an image $x_i$ that was last outputted at the previous time. If either one of the dissimilarity or the time interval is large enough, for example, larger than respective predetermined thresholds (in step 1103, Y), the current acquired image is transferred to the following processing.

The reason for the use of the dissimilarity is to prevent the same or approximately the same image from continuing for a long time. The reason for the use of the time interval is to adaptively adjust an evaluation criteria of the dissimilarity to a change when a signal indicative of an acquired image shows such a change.

In Step 1103, the coding processing section 201 detects the image change by using the following formula (1):

$$\frac{D(X_{i-1}, Z)}{D_{\max}} < \rho e^{-\beta |t_{i-1} - t_Z|} \qquad (1)$$

$$\beta = \frac{\ln 2}{\Delta \tau}$$

where Dmax is a maximum value of $D(x_{i-1}, Z)$, and $\rho$ is a percentage change necessary for acceptance of $x_{i-1}$ and Z. The function D is defined by formula (3) which will be mentioned later. Z is the newly acquired image, and $x_{i-1}$ is the last image that was outputted from the coding processing section 201. $\beta$ is a factor for adjusting the speed of adaptation. Experiment results by the inventor of the present invention has shown that $\Delta \tau$ and $\rho$ may be set to $\Delta \tau = 5$ sec and $\rho = 0.05$ on typical conditions. This means that the change necessary to determine whether to accept the current measurement image is a 5% change at first, but becomes a 2.5% change after 5 seconds.

Figure 7:
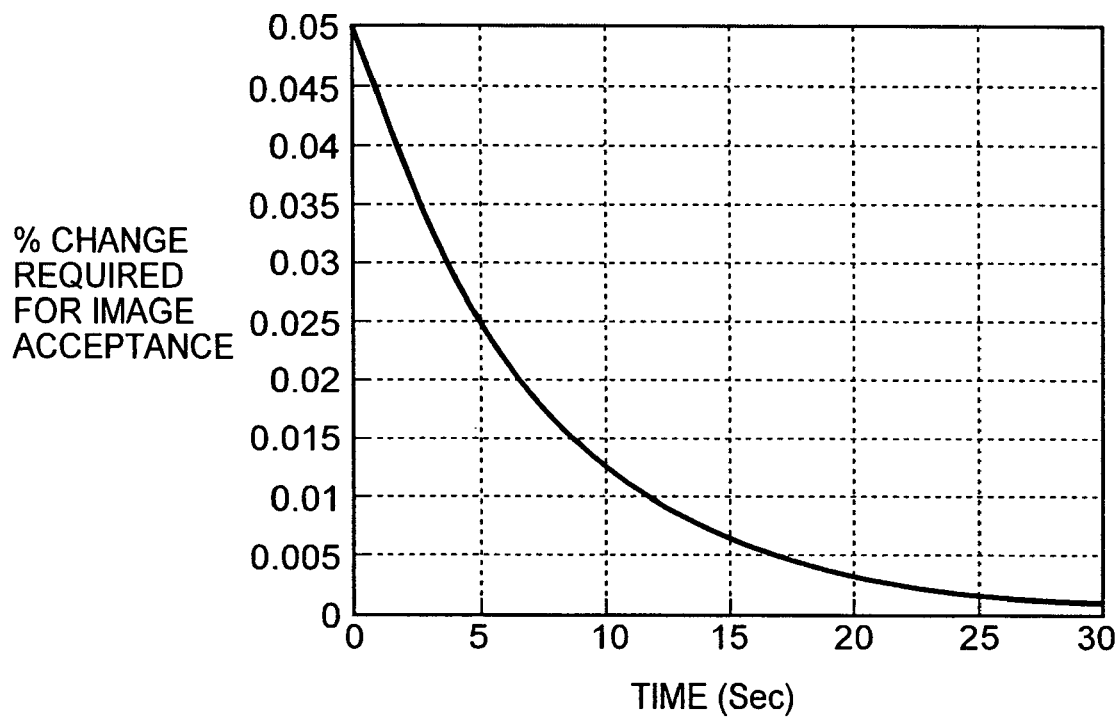
FIG. 7 is a graph showing a temporal variation of a threshold for change detection, the threshold being used in the matching processing according to an embodiment of the present invention.

The resultant adaptation curve for change detection is shown in FIG. 7. As elapsed time from the acceptance of the last image outputted from the coding processing section 201 increases, the threshold of change required for new image information to be accepted decreases exponentially. Finally, acceptance of a measurement image is effected by latent noise of the sensors. According to this configuration, it is possible to guarantee a minimum processing rate in the present processing. Furthermore, according to this configuration, a long period during which no change or no large change occurs in the environment (or even if a change sparsely occurs) can be represented by the past measurement result group stored in the optical information storage section 301. (hereinafter referred to as an image archive) and an HMM constructed on the basis of the image archive as well as a period during which changes frequently occur can also be represented in a similar manner.

Although the coding processing section 201 has been described, by way of example, as performing processing which takes dissimilarity and time into account, the kind of coding processing to be used in the present invention is not limited only to such processing. Alternatively, the present invention may use any arbitrary kind of coding processing as long as such coding processing can compress optical information, such as JPEG coding and run-length coding.

The image outputted from the coding processing section 201 is saved into the optical information storage section 301, and in step 1105 of FIG. 6, feature quantities of the image are calculated. In the present embodiment, distance vectors are calculated as the feature quantities, each of the distance vectors having as a vector element the difference between the current measurement image outputted from the coding processing section 201 and a respective one of the past images recorded in the image archive. In the present embodiment, by detecting such difference, it is possible to evaluate the optical similarity between the measurement image and each of the past images before execution of matching processing which will be described later.

Furthermore, in the present embodiment, in order to improve calculation speed, the past image sequence recorded in the image archive at the stage of step 1105 is configured such that the past images are continuously recorded in locations easily accessible by processing which will be described later.

In step 1105, the distance vector indicative of the difference between the image outputted from the coding processing section 201 and each of the past images of the image archive is obtained from the following formula (2). It is assumed here that the image group contained in the image archive is represented by $\{x_1, \ldots, x_M\}$. This past image group may also be constructed, for example, by merely continuously arranging the measurement images outputted from the coding processing section 201. An M-dimensional distance vector defined by the following formula (2) can be obtained by calculating the distance between the image thus coded and each of the stored images.

$$d_i = \begin{bmatrix} (x_i, x_1) \\ \vdots \\ (x_i, x_M) \end{bmatrix} \quad (2)$$

In formula (2), D(x, y) represents a measurement result containing a certain kind of distortion, in the measurement space of the sensors used for the acquisition of the image information. An arbitrary function that can represent the difference between the two images x and y can be used, but does not need to satisfy strict requirements for measurement (metric). In the present embodiment, the following L1 metric is used. In the following formula (3), HW represents the maximum values in the height direction and the width direction for each of the sensor indexes.

$$D(x, y) = \sum_{l}^{HW} \sum_{c}^{3} |x(l, c) - y(l, c)| \quad (3)$$

If any of the components of $x_i(l, c)$ exhibits a high correlation or a wide spread (i.e., the covariance matrix of $x_i$ is greatly different from the identity matrix of $x_i$), in practice, it is preferable to project the measurement results of the sensors onto the eigenspace of the sensors in accordance with the procedure of a well-known PCA method (Principle Components Analysis).

According to the PCA method, in the above-mentioned distortion calculation, it is possible to prevent a single component or a component group of the measurement results of the sensors from having an excessively large influence. In this case, the distortion measurement of formula (3) becomes as follows:

$$D(x, y) = \sum_{j} |x'_j - y'_j| \quad (4)$$
$$x' = \Lambda x$$
$$y' = \Lambda y$$

In formula 4, $\Lambda$ is a projection matrix based on an eigenvector, which "whitens" the measurement results of the sensors. $\Lambda$ can also be acquired by training with the measurement results of typical sensors.

Figure 8:
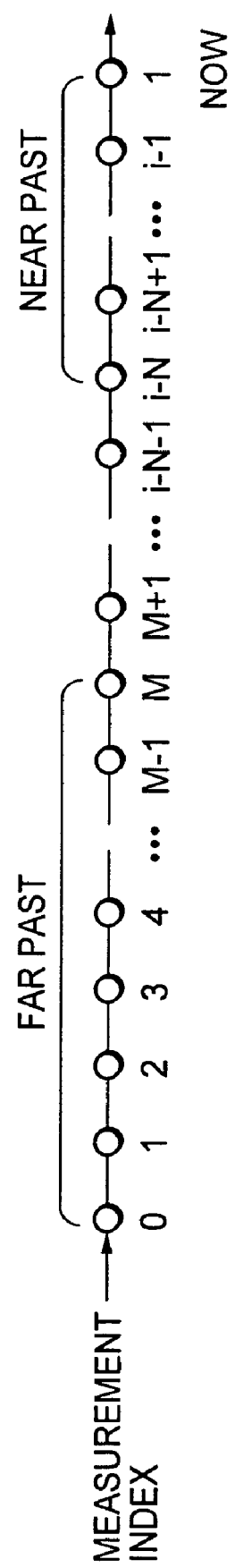
FIG. 8 is an explanatory view showing one example of a configuration of measured image date according to an embodiment of the present invention.

In step 1107, the distance vectors di calculated in step 1105 are stored into the distance vector storage section 203. The distance vector storage section 203 includes, for examples, a FIFO buffer. Alternatively, any arbitrary type of storage may be used instead of the FIFO buffer providing that such storage can store a predetermined number of calculated distance vectors in time order and allow ease access during calculation processing which will be described later. In the present embodiment, N-number of distance vectors acquired in time order from the most recent to more older ones are consistently stored in the FIFO buffer. These N-number of distance vectors are used in processing to be performed in the next step 1109. The content of the FIFO buffer is a matrix H representing the distance between the near past (in the present embodiment, the last N-number of images) and the far past (in the present embodiment, the M-number of images stored in the image archive) It is assumed here that the near-past images and the far-past images in the present embodiment have a time-sequence relationship as shown in FIG. 8.

Next, in step 1109, the matching processing section 204 performs matching between the near past represented by the matrix H stored in the distance vector storage section 203, and the far past represented by the Hidden Markov Model (HMM) $\lambda$ stored in the HMM storage section 302.

Figure 9:
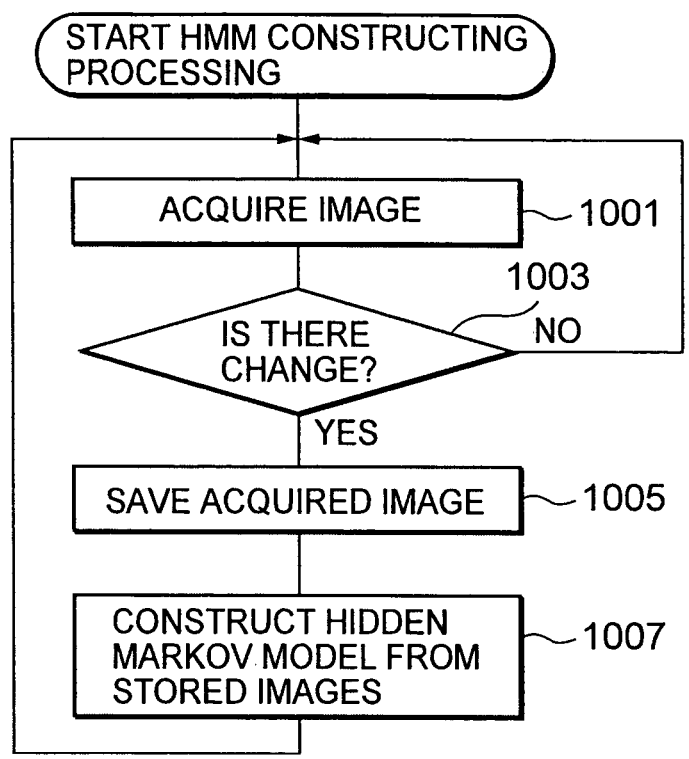
FIG. 9 is a flowchart showing one example of HMM construction processing according to an embodiment of the present invention.

The HMM ($\lambda$) is directly constructed from the contents of the image archive in accordance with the procedure shown in the flowchart of FIG. 9 by way of example. Specifically, as in steps 1101 and 1103 of FIG. 6, if a new image is acquired (step 1001), the new image is compared with the images outputted from the coding processing section 201 prior to the acquisition of the new image and the presence or absence of a change is determined by the above-mentioned formula (1) (step 1003). If it is determined that the new image has a change, the image is stored into the image archive (step 1005). In step 1007, each time a change occurs in the contents of the image archive, the coding processing section 201 reconstructs the HMM ($\lambda$), and stores the reconstructed HMM ($\lambda$) into the HMM storage section 302.

During the generation of an HMM, the parameters of the HMM are, in many cases, estimated from partially labeled data by via Expectation-Maximization or the like. However, in the present embodiment, each state of an HMM is directly associated with a single image, and a predetermined value is set as its transition parameter. The reason why the predetermined value is used as the transition parameter without performing training as in typical methods is as follows: Images (optical information) corresponding to the respective states of the HMM are acquired in the order of elapsed time. The elapsed time may also contain a discontinuous period because of the processing of step 1103, and in addition, the formula (1) is used to perform change detection taking an image change and a lapse of time into account. For this reason, it is considered that the possibility of occurrence of a transition to a temporally far state is small or zero. Accordingly, in the present embodiment, optimization processing for transition parameters need not be performed, so that calculation costs can be greatly reduced.

The transition parameters of the HMM are calculated on the basis of a truncated Gaussian distribution with a mean of zero (hereinafter referred to as the zero-mean truncated Gaussian) with respect to the temporal distance between two images, as expressed by the following formula (5) by way of example.

$$P(S_t = i \mid S_{t-1} = j) = \begin{cases} N(|t_i - t_j|; 0, \sigma_B), & |t_i - t_j| \leq \tau \\ 0, & |t_i - t_j| > \tau \end{cases} \quad (5)$$

In the HMM according to the present embodiment, the transition between temporally near states is permitted, and the transition between two temporally far images requires high costs.

Returning to step 1109 of FIG. 6, an optimal state sequence to match the near-past N-number of images and the far-past images all of which are represented as the matrix H of the distance vectors is determined by using the Viterbi algorithm, for example. The matrix H is used for the calculation of the following state beliefs:

$$P(x_i|s_i=j)=e^{-D(x_i,x_j)}=e^{-H_{ij}} \quad (6)$$

The Viterbi algorithm provides a solution to the following maximization problem. In the following formula, si represents a state corresponding to the i-th image $x_i$, and si* represents an optimized state. In the present embodiment, dynamic programming which is called the Viterbi algorithm is applied to obtain a solution to the maximization problem.

$$\{s_1^*, \cdots, s_N^*\} = \underset{\{s_1, \cdots, s_N\}}{\arg\max} P(s_1, \cdots, s_N | H, \lambda)$$

$$= \underset{\{s_1, \cdots, s_N\}}{\arg\max} P(x_i|s_1)P(s_1)\prod_{j=2}^{N} P(x_{i-j}|s_j)P(s_j|s_{j-1})$$

In step 1111, the value of the last state $s_{M^*}$ obtained as the result of the above-mentioned matching (hereinafter referred to as the context match) is outputted. In the case of the present embodiment, an image $x_{SM}$ corresponding to the state $s_{M^*}$ which is obtained as the result of the matching and is temporally the newest in the past similarity sequence, or a location/situation corresponding to the image $x_{SM}$, is outputted as the awareness result.

The Viterbi algorithm used in the present embodiment will be described below. The Viterbi algorithm gives the best one-to-one correspondence (best match) between two image groups $\{x_i, \ldots, x_M\}$ and $\{x_{1-N}, \ldots, x_i\}$ in accordance with a given HMM and the distance H between paired images. In this case, if the values of M and N are large, the Viterbi algorithm can be approximated. One of the most popular approximation method is a Viterbi Beam Search. According to the Viterbi Beam Search, it is very difficult to obtain the best match, but it is possible to obtain a correspondence equivalent to an allowable match. Furthermore, in the present embodiment, any arbitrary kind of processing that is capable of determining the one-to-one correspondence between the two image groups may be used in place of the Viterbi algorithm. Such an arbitrary kind of processing is operable to minimize, while maintaining temporal continuity, the distance between each of the images contained in the image group $\{x_1, \ldots, x_M\}$ and the corresponding one of the images of the image group $\{x_{1-N}, \ldots, x_i\}$. The Viterbi algorithm according to the present embodiment maintains the temporal continuity by means of the transition matrix of the HMM.

In the implementation of a standard Viterbi algorithm, its probability calculation is not directly performed. This is because if probabilities are sequentially multiplied, the throughput of the Viterbi algorithm may exceed the calculation capability of a computer. For this reason, in practice, natural logarithms of all possibilities are taken and the Viterbi algorithm is rewritten so that the formula thereof is represented by log-probability, in the following manner. In consequence, although all multiplications become additions, optimization can be realized in a similar manner.

$$\{s_1^*, \cdots, s_N^*\} = \underset{\{s_1, \cdots, s_N\}}{\arg\max} P(s_1, \cdots, s_N | H, \lambda) \quad (8)$$

$$= \underset{\{s_1, \cdots, s_N\}}{\arg\max} P(x_i|s_1)P(s_1)\prod_{j=2}^{N} P(x_{i-j}|s_j)P(s_j|s_{j-1})$$

$$= \underset{\{s_1, \cdots, s_N\}}{\arg\max} \log P(x_i|s_1) + \log P(s_1) +$$

$$\sum_{j=2}^{N} \log P(x_{i-j}|s_j) + \log P(s_j|s_{j-1})$$

A specific processing example of the Viterbi algorithm will be described later.

In the above-mentioned matching processing, there is a case where the order of images in a near-past image sequence greatly differs from the order of images in a far-past image sequence. If the two image sequences which respectively contain basically different events (images of different situations) are to be matched, low confidences of match can prevent the occurrence of problems. In this case, it is only necessary to display an indication that a low confidence has been obtained or to output a message such as "DETECTION OF MATCHING IMAGE FAILED".

However, in the worst case, the confidence of match may become high and erroneous results may be derived. This worst result easily occurs in the case where although there is a visual similarity between the two image sequences, locations are far apart or situations differ between the same in physical terms.

Figure 10:
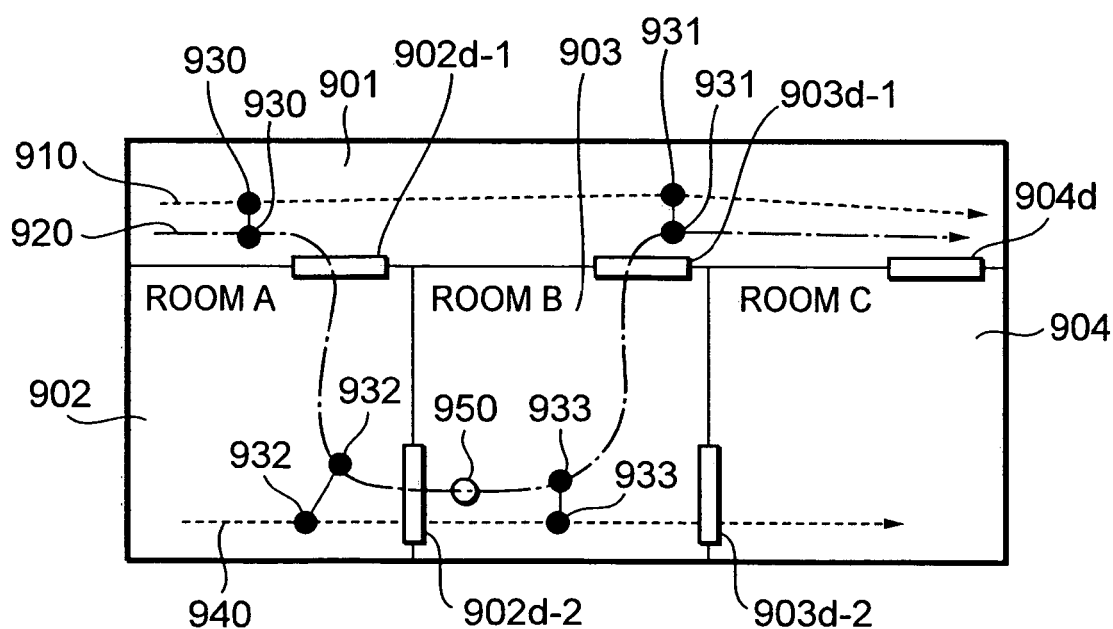
FIG. 10 is an explanatory view for explaining a matching processing using a landmark according to an embodiment of the present invention.

Erroneous matching also occurs in the case where a mismatch exits between orders of situations, as observed between the far-past image sequence (training example) and the near-past image sequence (test example) (refer to FIG. 10). In the present embodiment, the concept of "landmark" is used to decrease such mismatch. For example, matching processing is performed by taking into account whether the degree of matching of two images being compared is high and each of the images is an image or optical information which can be recognized as a landmark (characteristic mark or symbol). Furthermore, in the present embodiment, the landmark can be used to intelligently determine the lengths of the near-past image sequences to be used in matching, thereby increasing the efficiency and speed of matching processing.

In the example shown in FIG. 10, paths which are respectively represented by dashed lines 910 and 940 are training examples, while a path represented by a dot-dashed lined 920 is a test example. It is assumed here that the image archive contains only images obtained along the paths of the two training examples, one of which advances along a corridor 901 from a room A 902 to a room B 903 and the other of which advances from the room A 902 to a room C 904 through doors 902*d*-2 and 903*d*-2. The path 920 of the test example starts from the corridor 901, enters the room A 902 through a door 902*d*-1, passes through the door 902*d*-2 into the room B 903, and returns to the corridor 901 through the door 903*d*-1.

If the entire path 920 of the test example and the path 910 or 940 of either one of the training examples are matched to each other by a conventional method using no landmark, a mismatch will easily occur because the orders of the images of both paths differ from each other, so that it is not clear whether a correct result can be obtained. Furthermore, even if a match is found, the possibility that the probability of matching is low will be high.

As a solution to this issue, the present inventor have directed his attention to the fact that, if optical images are being continuously acquired with lapse of time, there will be points of locations which can function as landmarks in a number of paths. It has, for example, been discovered that in the example shown in FIG. 10, if a landmark (such as a distinctive door) is present at any of points of locations denoted by dot pairs 930 to 933, a far more accurate matching result can be obtained by using an image sequence ending with the landmark, as an image sequence of the near past. In the situation (a location 950) where the present system has entered, for example, the room B 903 along the path 920 of the test example, if the system performs ordinary matching processing by using all data acquired so far, the system cannot determine whether it is located in the path 910 or 940 of either one of the training examples. However, in the matching processing using a landmark, an image sequence ending with the last landmark 932 is used as the path of one of the test examples. Accordingly, the system can correctly recognize that it is currently positioned at a location along the path 940 of one of the training examples. Alternatively, instead of fixing the length of the image sequence to the length up to the landmark, it is also possible to adjust the length of the near-past image sequence to be used for matching processing in accordance with the location of the landmark.

According to the present embodiment, by using the landmark, it is possible to determine to what point of location the history of a near-past image sequence to be used in matching processing should be traced. Accordingly, even in the above-mentioned case where the orders of images of paths differ from each other, matching processing can be effected more accurately.

In the present embodiment, since the Viterbi algorithm is used, the landmark can be easily detected. In the case of typical Viterbi algorithms, each path is extended in a Viterbi Trellis diagram in the forward direction (in the forward direction of time) so as to propagate state scores. Conversely, in the present embodiment, each path is extended in the backward direction of time from the current location toward the past.

Figure 11:
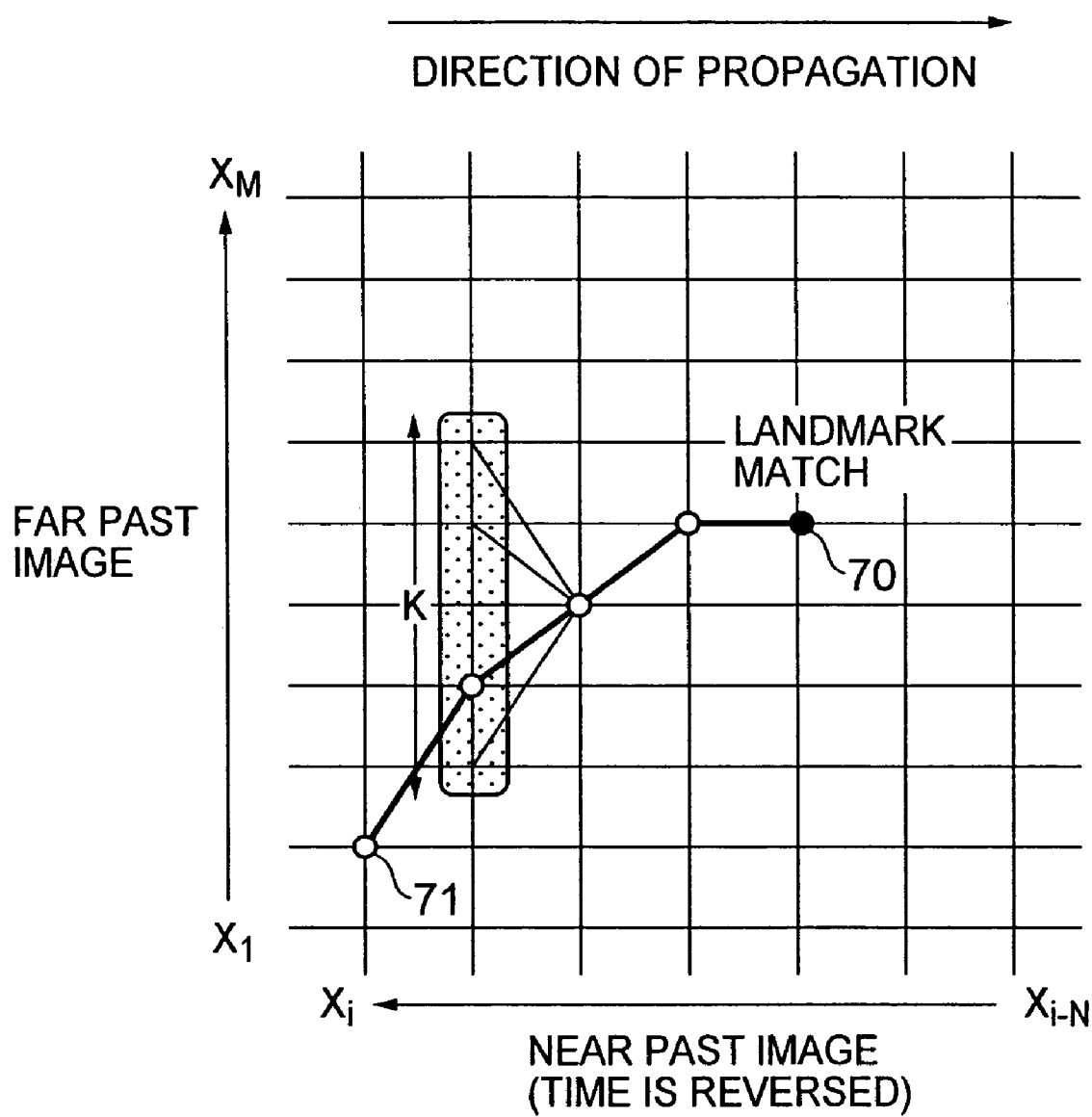
FIG. 11 is a Viterbi Trellis diagram for explaining a matching processing using a landmark according to an embodiment of the present invention.

Detection of a landmark and matching processing using the landmark in the present embodiment will be described below with reference to FIGS. 11, 12A and 12B. FIG. 11 shows one example of a Viterbi Trellis diagram used in the matching processing of the present embodiment, and the vertical direction corresponds to the far-past images $x_1$ to $x_M$, while the horizontal direction corresponds to the near-past images $x_i$ to $x_{i-N}$. The matching processing is started at a current location 71, and propagates state scores in a temporally backward direction until a landmark match 70 is detected. In each step, only k-number of states having non-zero transition probabilities are taken into account in accordance with the transition parameters set in advance by the above-mentioned formula (5).

FIG. 12A shows a pseudo code representing one example of the matching processing using detection of a landmark match on the basis of the Viterbi algorithm. The pseudo code of the present embodiment will be described with reference to a viterbi formula expressed by the following log-probability.

Initialization $$\alpha_1(j)=A(1,j)\ 1\leq j\leq M \quad (9)$$

Reduction $$\alpha_{i+1}(j)=A(i+1,j)+\max\{\alpha_i(k)+B_{jk}\}\ 1\leq j\leq N--1\leq j\leq M \quad (10)$$

End $$s^*_N=\arg\max\{\alpha_N\}$$

$$s^*_i=\text{pred}(i,s^*_{i+1})\ 1\leq i\leq N--1 \quad (11)$$

In the pseudo code shown in FIG. 12A, steps 1 to 3 are initialization processing, particularly, initialization of alpha variables. Steps 4 to 12 are reduction processing. In these steps 1 to 12, alpha(prev, j) is $\alpha i(j)$, alpha(now, j) is $\alpha i+1(j)$, and temp(k) is $\alpha i(k)+Bjk$. Steps 13 to 16 are end processing.

The pseudo code shown in FIG. 12A differs from standard Viterbi formulas in the following respects:

1. Time advances in the backward direction.
2. In the landmark detection of step 10, its reduction loop is stopped at an early time. "Is-Landmark-Present(i, pred, threshold)" used in this landmark detection processing will be described later with reference to FIG. 12B.
3. In the pseudo code shown in FIG. 12A, only the current and previous columns of the alpha matrix are held.

In the present embodiment, if a landmark match is detected, a solution is obtained by tracing back an optimal path found by this point in time to the current location. In the present embodiment, when all paths or substantially all paths pass through one state in the Viterbi Trellis diagram, it is defined that a landmark match is detected at that point in time. The term "substantially all paths" means a condition that can be determined to be equivalent to the term "all paths" within an error range allowed for processing of an application to which the present invention is applied. In a case where only low matching accuracy is required, detection of a landmark match may be determined if a state through which much more paths pass than those of any other state is found among states.

It should be noted that it is not greatly useful even if a path is extended forwardly in the Viterbi Trellis diagram and reaches a landmark. This is because it is always possible that the path may still arbitrarily disperse, and it is not clear what solution can be obtained at the end of the Viterbi Trellis diagram. Contrarily, in the present embodiment, a path is extended to the backward direction in time. Accordingly, when a landmark is detected, the path need not to be further extended in the Viterbi Trellis diagram. This is because a solution to the starting point in the Viterbi Trellis diagram does not change.

By using the above-mentioned landmark, it is possible to automatically identify another approach to the current situation of a user, even if the original past situations stored as images in the image archive do not have any corresponding situations or situations which can be accurately matched.

If all the transition probabilities are not zero, the above-mentioned matching processing using detection of a landmark can be realized without any problem. However, in the present embodiment, a truncated Gaussian which has a predetermined width and whose transition probabilities become zero in an area exceeding the predetermined width is used in view of practical applications. Accordingly, all other states are not accessible from every state. For this reason, in the present embodiment, a threshold is provided with respect to a decision as to the degree of matching, and detection of a landmark match is performed by using the threshold.

For example, in the present embodiment, even in the case of zero transition probability, the presence or absence of a landmark is detected through the processing shown in FIG. 12B. In the processing shown in FIG. 12B, in step 1, the count is initialized, and in steps 2 and 3, the number of paths passing through each state is counted and it is determined whether a maximum count value is larger than the threshold.

If all the transition probabilities are not zero, the threshold can be set to M-1. According to this setting, only if all paths make transitions bypassing through one state, a landmark is detected. In cases to which the above-mentioned cases are not applied including the case of zero transition probability, the threshold may alternatively be set to, for example, 0.5×M, which is lower than M-1, so as that a large number of paths or substantially all paths pass through one state.

In practice, there is a case where the Viterbi Trellis diagram used in the above-mentioned matching processing becomes extremely large. In this case, pruning of the paths becomes necessary in order to prevent the complexity of calculation processing (in the case of the Viterbi algorithm, temporally $O(NM^2)$) from becoming infinitely large. In the formula $O(NM^2)$, M denotes the number of images contained in the image archive, and N denotes the number of images contained in the near-past time sequence. For this reason, the complexity becomes extremely large in complex environments which exhibit a large number of variations.

In the present embodiment, various measures are taken in order to decrease the complexity of the calculation processing. One of the measures is the above-mentioned coding processing executed by the coding processing section 201. In the coding processing, a change in an image is detected to remove the redundancy of images, so as that the amount of data of the images is compressed without substantially impairing the amount of information of the images to be stored into the image archive. Furthermore, in the present embodiment, a truncated Gaussian is used as a transition function, and calculations are not performed on paths which pass through transitions having zero probabilities. If these measures are taken, the actual cost of the calculation processing of the Viterbi algorithm become $O(NKM)$. In the formula $O(NKM)$, K denotes the number (constant) of non-zero probability transitions which exit from each state of the Hidden Markov Model $\lambda$. Accordingly, the complexity of the calculation processing of the Viterbi algorithm in the present embodiment becomes temporally linear with respect to the size of the image archive.

Furthermore, if optimization processing using data having a tree structure used in a k-nearest neighbor method (k-NN), the complexity can be decreased in logarithmic time to approximately M which is the size of the image archive.

The optimization processing is realized by setting a subset (for example, of size L) of the image archive, where the degree of matching, for example, is expected to become high. This processing is the one originally aimed at by the k-nearest neighbor method. After that, the Viterbi algorithm is executed on only the subset of size L instead of the entire image archive. According to this processing, the above-mentioned complexity becomes $O(NKL^2 \log M)$.

The subset includes L-number of images contained in the image archive $\{x_1, \ldots, x_M\}$, which are the nearest each image contained in the image group $\{x_{i-N}, \ldots, x_i\}$. The nearest L-number of images are determined by the L1 metric. The subset differs for each image $x_i$. More specifically, only the L-number of images which are the nearest each image $x_i$ are taken into account instead of all the images contained in the image archive being taken into account for each image $x_i$. Accordingly, not all the columns of the matrix H are calculated, and not all the states in the HMM are taken into account.

As a method of determining the nearest L-number of images with respect to the image $x_i$ from among the image archive $\{x_1, \ldots, x_M\}$, it is possible to use, for example, an arbitrary standard k-nearest neighbor method (k=L).

It should be noted that if Viterbi calculations are performed in a log-probability space, all the calculations can be performed with 16-bit integers. These calculations are based on the assumption that acquired sensor data are represented in an integer format, and this assumption corresponds to cases where image data is obtained by typical image capturing process and analog-to-digital conversion.

If an image archive having a not-so-large size is used, and if the above-mentioned optimization processing is executed, real-time processing can be implemented even with in expensive built-in hardware such as so-called one-chip computers. Furthermore, the Trellis structure of the above-mentioned algorithm is suited for implementation on an FPGA (Field Programmable Gate Array).

In the above-mentioned matching processing according to the present embodiment, the context match is found with a time sequence pattern of images. Accordingly, high-resolution image data are not necessary, i.e., the apparatus according to the present embodiment need not to use high-resolution sensors in the optical information acquisition unit 10. Therefore, according to the present embodiment, since faces or letters themselves are not recognized, it is possible to effect situation recognition without invading the privacy of the user or the surrounding environment. The apparatus according to the present embodiment may provide an advantageous effect of efficiently effecting situation recognition with image data of lower resolution than typical resolutions of images used by conventional apparatuses.

As described hereinabove, according to the above-mentioned embodiment, there is provided a system equipped with a memory function using optical information such as images. According to the above-mentioned embodiment, it is possible to realize the following functions in various information processing systems such as robots, wearable computers and environment monitoring systems.

Figure 13:
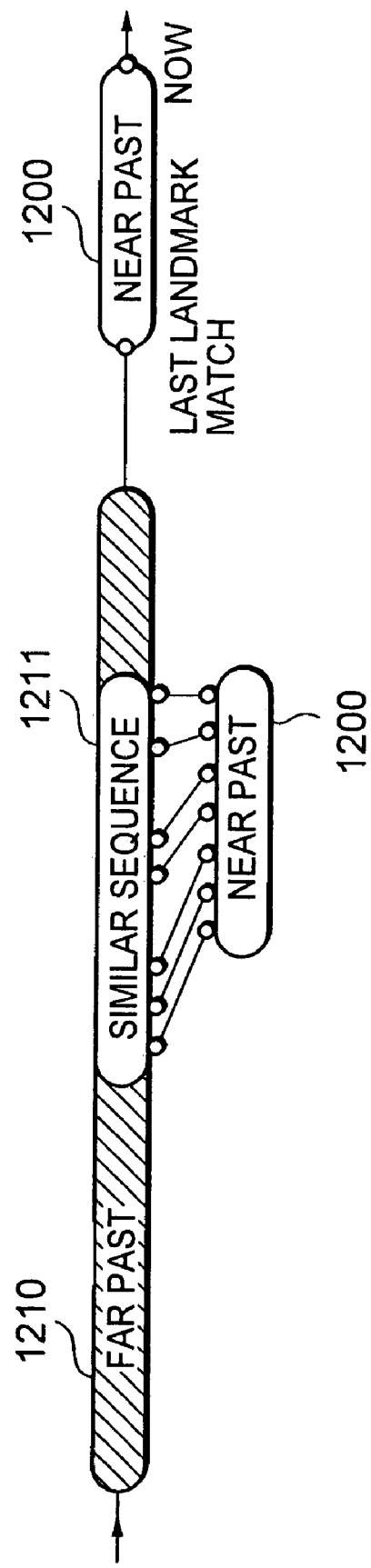
FIG. 13 is an explanatory view schematically showing a matching processing according to an embodiment of the present invention.

(1.1) MEMORY RECALL (RECALL): to automatically recall a context in a past situation by matching the current situation and the past situation. For example, as shown in FIG. 13, matching is performed on a near-past image sequence 1200 from the current time to the last landmark and a far-past image sequence 1210 stored in the image archive, thereby calculating a similar sequence 1211 which has a high matching degree with the near-past image sequence 1200. Furthermore, if images are respectively marked with labels indicative of situations in the far-past image sequence 1210 as shown in FIG. 14 by way of example, a time point 1220 is identified which corresponds to the current situation in the similar sequence 1211 which has been found as the result of matching. Accordingly, it is possible to recall a situation similar to the current situation (in FIG. 14, inside a train).

(1.2) JUST-IN-TIME INFORMATION (JIT): to recognize a situation and provide information which is necessary for the recognized situation. This function uses tagging based on a recognized location, for example.

(1.3) ANOMALY DETECTION: the opposite function to the above-mentioned RECALL function. If the matching of the current situation and the past situation does not succeed, this function determines that the apparatus is in a new situation not yet encountered (FIG. 15B). By using the function, it is possible to detect a situation different normal situations and activate a recording unit and the like.

(1.4) PREDICTION: In the case where a situation B occurred after a situation A in the past, this function can predict that the situation B will occur next if the current situation is recognized as the situation A (FIG. 15A). The function is applied to a unit, such as a guidance unit, which operates on the basis of anticipation, and makes it possible to provide appropriate services with good timing, by anticipating the intention of the user or the next action of the user.

(1.5) COMPARISON: to compare the past and current situations and detect a change such as a change of pictures on a wall (FIG. 15C).

Furthermore, it is not necessary to label all the data stored in the image archive in order to realize the above-mentioned functions in the present embodiment. In the present embodiment, for example, even data which are not manually labeled can have specific values for users or applications that use the present embodiment. Namely, it is possible to uniquely define a relative temporal relationship between unlabeled data and other labeled data.

In the RECALL function mentioned above in (1.1), as shown in FIG. 14 by way of example, if a situation exists between "HOME" and "COMPANY" and the near-past (current) situation are matched, it is possible to recognize that the current situation is "BETWEEN HOME AND TRAIN". As a matter of course, it is also preferable to configure the system such that after image data has been manually labeled with "HOME", "TRAIN or the like, unlabeled image data is automatically labeled with "BETWEEN HOME AND TRAIN" or the like on the system side of the present embodiment.

More specifically, it is preferable to adopt a configuration in which if an unlabeled situation and the current situation are matched, a message to be displayed or given to the user when the matched result is outputted to the user is generated by using information attached as a label to one or a plurality of situations and closer in time to the matched situation, from among the situations stored in the image archive.

Furthermore, it is also preferable to adopt a configuration in which the matched situation is labeled with information which is newly generated by using the information attached as a label to the one or plurality of situations.

Furthermore, the "PREDICTION" function mentioned above in (1.4) is configured to match the current situation and the past situation and predict a future situation at that point in time, so that it is not necessary to label image data corresponding to an unpredicted past situation, for example, data before a predicted future 1230 shown in FIG. 15A. Furthermore, labeling is not needed in either of the "ANOMALY DETECTION" and "COMPARISON" functions shown in FIGS. 15B and 15C.

If the above-mentioned embodiment is applied to a wearable computer equipped with photosensors arranged so as to capture images of the environment of a user, some possible uses are as follows.

(2.1) META-TAGGING: to tag situation-related information onto other forms of recorded information such as telephone conversations, received text messages, and taken photographs.

(2.2) SITUATION RECOGNITION: situation recognition for software agents (including location awareness).

(2.3) ANOMALY DETECTION: awareness of situations which are highly likely to be dangerous or need special actions (for example, medical emergencies, criminal activities).

(2.4) PREDICTION: prediction of the user's next situation based on past events; for example, in the case where the user in the past called a taxi after having gone out of a restaurant, a service corresponding to this past event is provided.

If the present embodiment is applied to a robot equipped with photosensors arranged so as to capture images of the environment of the robot, some possible uses are as follows.

(3.1) ROBOTIC IMAGE MEMORY FUNCTION: to support analytic planning, as well as to support an emotive function which makes the robot feel unpleasant about a situation which is likely to bring a predetermined action to failure when the robot is to complete the predetermined action.

(3.2) PREDICTION: action prediction for the robot, which is realized by modeling probabilistic rules for predicting what the next situation will be, when the robot performs a particular action in a predetermined situation (for example, like navigation which enables the robot to predict the result of its own action and guide itself toward a desire situation).

The above-mentioned embodiment may also be applied to apparatuses having no moving functions, security monitoring apparatuses, patient monitoring apparatuses, or other arbitrary apparatuses which visually monitor space and objects. In this case, since monitoring processing is mainly performed, the above-mentioned ANOMALY DETECTION function is useful, for example. Furthermore, the present embodiment can be used for activating other systems according to detected situations, for example, notifying nurses that a patient had a spasm while asleep.

Furthermore, the apparatus according to the above-mentioned embodiment may further include a communication section. The communication section may, for example, be configured to perform wired or wireless communication with an external unit so as to read a plurality of optical information sequences and/or a Hidden Markov Model, and uses the read optical information sequences and/or Hidden Markov Model in the matching processing. The optical information sequences have a format equivalent to that of the above-mentioned image archive of the present embodiment, and the Hidden Markov Model is constructed on the basis of the plurality of optical information in the same way as in the present embodiment.

Furthermore, instead of using the apparatus according to the above-mentioned embodiment, it is possible to connect the above-mentioned type of optical information acquisition unit to a general-purpose computer system including an operational processing unit, a memory and a user interface, and provide a computer program which causes the general-purpose computer to execute processing for realizing the situation recognition according to the present embodiment. The computer program may be transmitted to individual computer systems directly by wired/wireless communication or via a network, or may be distributed in the form of being stored in recording media.

Furthermore, instead of using the apparatus according to the above-mentioned embodiment, it is possible to apply the present invention to a mobile type of electronic apparatus so as to cause the electronic apparatus to execute the situation recognition processing and use the obtained result for some of original operations of the electronic apparatus. Examples of the electronic apparatus to which the present invention can be applied may include mobile telephones, PDAs, portable types of storage medium replay apparatuses for replaying storage media such as CDs and DVDs, and image capturing apparatuses such as digital cameras and camcorders.

The present invention contains subject matter related to Japanese Patent Applications JP 2004-191308 and JP 2005-000115 filed in the Japanese Patent Office on Jun. 29, 2004 and Jan. 4, 2005, respectively, the entire contents of which being incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A situation recognition apparatus that recognizes a current situation by using optical information, the apparatus comprising:

an optical information acquisition unit configured to acquire first optical information and second optical information about an external environment;

a storage configured to store the first optical information in an image archive comprising optical information about the external environment;

a processing unit configured to determine whether the second optical information is a redundant copy of the first optical information based on either a dissimilarity or a time interval between the first optical information and the second optical information, wherein the second optical information is stored in the image archive if the dissimilarity or the time interval surpasses a threshold;

the storage being configured to store a probabilistic model, constructed from optical information in the image archive, that numerically represents transitions between optical information in the image archive;

wherein the processing unit includes;
a difference calculation section that calculates values indicative of the differences between the second optical information and optical information in the image archive;
a difference storage section that stores the calculated values in time order; and
a matching processing section that determines whether the second optical information matches any of the optical information in the image archive by determining a correspondence between a sequence of values stored in the difference storage section and the probabilistic model; and
an output unit configured to output a result of the matching.

2. The situation recognition apparatus according to claim 1, wherein the probabilistic model is configured such that individual states of the probabilistic model correspond to the optical information in the image archive, and transition parameters between the individual states are set to predetermined values.

3. The situation recognition apparatus according to claim 1, wherein the probabilistic model is a Hidden Markov Model.

4. The situation recognition apparatus according to claim 1, wherein the coding processing section is configured to compress a data amount of the optical information to be used in the matching.

5. The situation recognition apparatus according to claim 1, wherein the matching processing section determines by using a Viterbi algorithm an optimal state sequence which matches the optical information and a time sequence of the values indicative of the differences.

6. The situation recognition apparatus according to claim 5, wherein the determination of the optimal state sequence is executed by extending a path in a Viterbi Trellis diagram in a time-reversed direction from a state which is nearest to a current time.

7. The situation recognition apparatus according to claim 5, wherein
the matching processing operates such that if substantially all paths pass through one state in the Viterbi Trellis diagram, the state is detected as a landmark, and the landmark is used to set a length of the time sequence or the values indicative of respective differences, the time sequence being used in the matching processing.

8. The situation recognition apparatus according to claim 1, wherein the matching processing section operates such that, if the matching processing section obtains optical information which matches with a portion of the optical information with a probability higher than a predetermined threshold, the portion of the optical information is detected as a landmark and, by using the landmark, a length of the time sequence of the values indicative of the differences is determined.

9. The situation recognition apparatus according to claim 1, wherein a portion of the optical information stored in the storage is marked with labels indicative of corresponding states.

10. The situation recognition apparatus according to claim 9, wherein:
portions of the optical information stored in the storage are not marked with labels indicative of corresponding states; and
the output unit outputs a matching result to a user by using information indicated by a label or labels corresponding to the optical information marked with the labels, which are closer in time to the optical information that is not marked with the label if the second optical information and the optical information that is not marked with the label are matched.

11. The situation recognition apparatus according to claim 9, wherein the processing unit further attaches a label to the optical information that is not marked with the label, by using information indicated by a label or labels corresponding to the optical information marked with the labels, which are closer in time to the information that is not marked with the label.

12. The situation recognition apparatus according to claim 1, wherein the optical information acquisition includes a plurality of photosensors.

13. The situation recognition apparatus according to claim 12, wherein the optical information acquisition unit further includes a condenser configured to condense light onto each of the plurality of photosensors.

14. A system including a situation recognition apparatus and a processing execution apparatus that executes predetermined processing by using a recognition result outputted from the situation recognition apparatus, wherein the situation recognition apparatus recognizes a current situation by using optical information, the situation recognition apparatus comprising:
an optical information acquisition unit configured to acquire first optical information and second optical information about an external environment;
a storage configured to store the first optical information in an image archive comprising optical information about the external environment;
a processing unit configured to determine whether the second optical information is a redundant copy of the first optical information based on either a dissimilarity or a time interval between the first optical information and the second optical information, wherein the second optical information is stored in the image archive if the dissimilarity or the time interval surpasses a threshold:
the storage being configured to store a probabilistic model, constructed from optical information in the image archive, that numerically represents transitions between optical information in the image archive;
wherein the processing unit includes:
a difference calculation section that calculates values indicative of the differences between the second optical information and optical information in the image archive;
a difference storage section that stores the calculated values in time order; and
a matching processing section that determines whether the second optical information matches any of the optical information in the image archive by determining a correspondence between a sequence of values stored in the difference storage section and the probabilistic model; and an output unit configured to output a result of the matching to the processing execution apparatus.

15. A method of recognizing a current situation by performing matching processing of first optical information with optical information in an image archive, the method comprising:

determining whether the first optical information is a redundant copy of a portion of the optical information in the image archive based on either a dissimilarity or a time interval between the first optical information and the portion of the optical information in the image archive, wherein the first optical information is stored in the image archive if the dissimilarity or the time interval surpasses a threshold;

constructing a probabilistic model from the optical information in the image archive, which numerically represents transitions between the optical information in the image archive;

calculating distance values indicative of the differences between the first optical information and optical information in the image archive;

storing the calculated distance values in a sequence in time order;

matching the first optical information and optical information in the image archive by determining a correspondence between a sequence of distance vectors and the probabilistic model; and outputting a result of the matching.

16. A computer-readable storage medium on which a computer program is stored, the computer program causing a computer to execute a method of recognizing a current situation by performing matching processing of first optical information with optical information in an image archive, the method comprising:

determining whether the first optical information is a redundant copy of a portion of the optical information in the image archive based on either a dissimilarity or a time interval between the first optical information and the portion of the optical information in the image archive, wherein the first optical information is stored in the image archive if the dissimilarity or the time interval surpasses a threshold;

constructing a probabilistic model from the optical information in the image archive, which numerically represents transitions between the optical information in the image archive;

calculating distance values indicative of the differences between the first optical information and optical information in the image archive;

storing the calculated distance values in a sequence in time order;

matching the first optical information and optical information contained in the image archive by determining a correspondence between a sequence of distance vectors and the probabilistic model; and outputting a result of the matching.

* * * * *